J. C. LANG,

Assignor to THE NATIONAL SHELF AND FILE CO.

METALLIC BILL FILE CASE.

No. 10,309. Reissued Apr. 10, 1883.

WITNESSES:

Fred. G. Dieterich.

J. Heylmun

INVENTOR.

John C. Lang, by Heylmun & Lang

ATTORNEYS.

UNITED STATES PATENT OFFICE.

JOHN C. LANG, OF WASHINGTON, DISTRICT OF COLUMBIA, ASSIGNOR TO THE NATIONAL SHELF AND FILE COMPANY, OF SAME PLACE.

METALLIC BILL-FILE CASE.

SPECIFICATION forming part of Reissued Letters Patent No. 10,309, dated April 10, 1883.

Original No. 262,793, dated August 15, 1882. Application for reissue filed February 26, 1883.

*To all whom it may concern:*

Be it known that I, JOHN C. LANG, a citizen of the United States of America, residing at Washington, in the District of Columbia, have invented certain new and useful Improvements in Metallic Bill-File Cases, of which the following is a specification, reference being had therein to the accompanying drawings.

My invention relates to a portable case for bill-files; and the novelty consists in the construction and arrangement of parts, as will be more fully hereinafter set forth.

The objects of the invention are to provide such a construction of frame made in sections, so that as many sections as may be desired to accommodate a given number of files may be readily employed and secured together at will; to provide means by which the file will be suspended in juxtaposition with its appropriate cell or pigeon-hole in the most convenient position for inspection and handling of the papers; to provide a suspended index-clip which, while it indicates that its file is out of the cell, contains a brief summary of the file contents, and upon which papers taken from the file may be charged.

Figure 1:
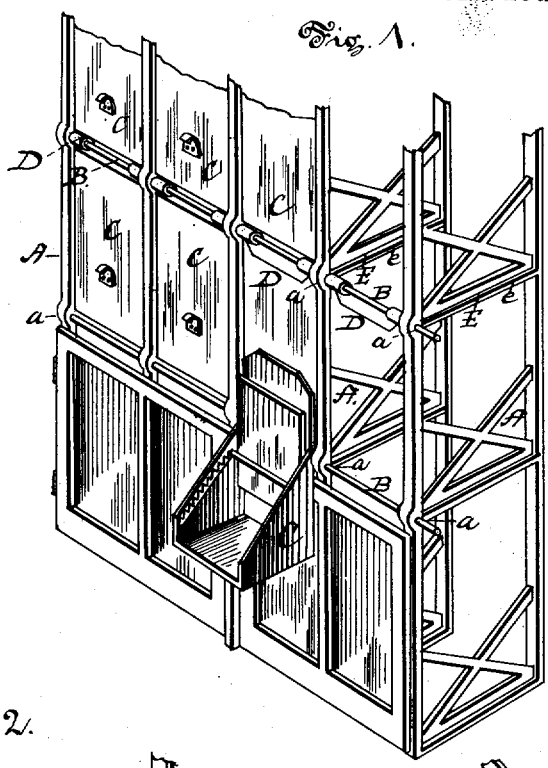
Figure 2:
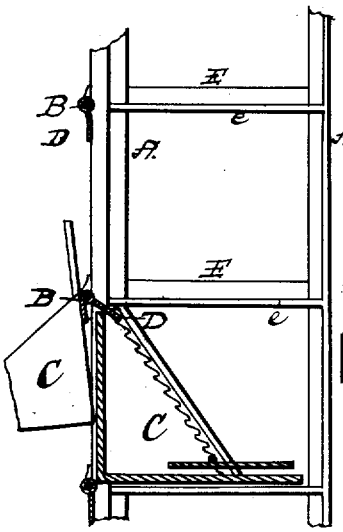
Figure 4:
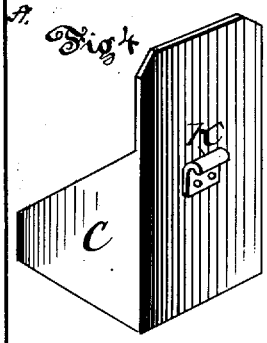
Figure 3:
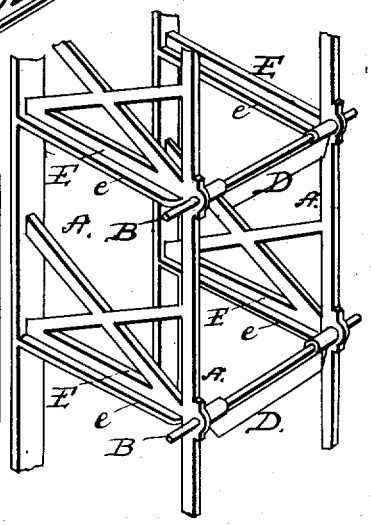

In the accompanying drawings, which form a part of this specification, Figure 1 is a perspective view, showing a number of detachable frames or castings and one of the paper-files suspended. Fig. 2 is an end elevation, partly in section, showing the file in the same position. Fig. 3 is a perspective view of the frames upon a larger scale; and Fig. 4 is a perspective view of the file, showing its suspending-hook.

To enable others skilled in the art to which the invention relates to make and use the same, I will describe the construction and mode of operation of the same, referring to the drawings, in which similar letters of reference indicate like parts in all the figures, and in which—

A represents a section of a vertical metallic frame adapted to serve in series, and each having T-shaped cross-pieces E, with ledges *e*, furnishing bearings for the traverse of the bill-files C, the construction of which, forming no part of this application, need not be described. These frames A are adapted to serve in a series along the face of a wall, and are provided with apertures *a*, in which operate tie-rods B, and the frames are held secure upon the rod B by a thread and nut connection, or simply bending the extreme ends of the rod at a right angle.

Suspended from the rod B by narrow ears or hooks between each two frames A is a thin metal index-plate, D, upon which the contents of the file may be noted or a paper charged. This plate is pressed or forced inward as the file is placed in its cell or pigeon-hole, and is thus concealed. The plate, ears, or hooks are located near the contiguous frames, leaving a space between upon the rod B to receive a suspending-hook, K, upon the face of the file C. The files traverse the guides *e*, and as they are pulled out of their cells the hook K engages the rod B. If the file is removed to another room, for instance, the index-plate indicates its contents in its absence.

The operation is obvious from the foregoing—that is to say, it will be observed by reference to the drawings that the guides or ledges *e*, attached to the vertical frame A, act as side supports in sustaining the bill-files C in a horizontal position, and that the tie-rods B serve a double office—to wit, means for connecting together the vertical frames, and provision for suspending or hanging the bill-files C while their contents are being examined.

What I claim as new, and desire to secure by Letters Patent, is—

1. A case or receptacle for file-holders, composed of a plurality of vertical frames having bearing ledges or guides and perforations, in combination with a tie-rod, substantially as described.

2. A case or receptacle for file-holders, consisting of a series of frames, A, having cross-bars E, bearing-ledges *e*, and perforations *a*; whereby said series may be secured together by the rod B, substantially as and for the purposes set forth.

3. The combination, substantially as hereinbefore described, of a case or receptacle composed of a series of vertical frames having bearing ledges or guides, perforations and tie-rods, and a series of bill-files, with suspending-hooks, substantially as and for the purposes set forth.

4. In a file-case, a series of frames, A E *e*, and the rod B, having the index-plate hung thereto, in combination with the removable file-case C K, as and for the purposes set forth.

In testimony whereof I affix my signature in presence of two witnesses.

JOHN C. LANG.

Witnesses:

EDW. T. PRITCHARD,

D. D. KANE.